(12) United States Patent
Ito

(10) Patent No.: US 7,224,649 B2
(45) Date of Patent: May 29, 2007

(54) INFORMATION RECORDING AND REPRODUCTION APPARATUS, INFORMATION RECORDING AND REPRODUCTION METHOD, AND BROADCAST RECEIVING APPARATUS

(75) Inventor: Seigo Ito, Hanno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 459 days.

(21) Appl. No.: 10/620,707

(22) Filed: Jul. 17, 2003

(65) Prior Publication Data
US 2004/0013060 A1    Jan. 22, 2004

(30) Foreign Application Priority Data

Jul. 18, 2002   (JP) ............................. 2002-209652

(51) Int. Cl.
  *G11B 7/0045*  (2006.01)
(52) U.S. Cl. .................................. 369/47.12
(58) Field of Classification Search ................ None
  See application file for complete search history.

(56) References Cited

U.S. PATENT DOCUMENTS 6,389,223 B1   5/2002   Aotake 6,442,327 B1 *   8/2002   Yamada et al. ............... 386/46
6,504,993 B1 *   1/2003   Matsumoto .................. 386/95

FOREIGN PATENT DOCUMENTS

| EP | 0 896 469 A2 | 2/1999 |
|---|---|---|
| JP | 5-282793 | 10/1993 |
| JP | 11-7705 | 1/1999 |
| JP | 11-39846 | 2/1999 |
| JP | 11-66661 | 3/1999 |
| JP | 2000-175139 | 6/2000 |
| JP | 2002-93042 | 3/2002 |
| JP | 2002-140857 | 5/2002 |

\* cited by examiner

*Primary Examiner*—Joseph Haley
(74) *Attorney, Agent, or Firm*—Pillsbury Winthrop Shaw Pittman, LLP

(57)   ABSTRACT

An information recording and reproduction apparatus comprising a recording and reproduction section configured to record and reproduce information in and from one recording medium of a first group and at least one recording medium of a second group, which has a smaller recording capacity than the one recording medium of the first group, and a registering section configured to reserve, in the one recording medium of the first group, a recording region which corresponds to the recording capacity of the at least one recording medium of the second group.

13 Claims, 10 Drawing Sheets

INFORMATION RECORDING AND REPRODUCTION APPARATUS, INFORMATION RECORDING AND REPRODUCTION METHOD, AND BROADCAST RECEIVING APPARATUS

CROSS-REFERENCE TO RELATED APPLICATIONS

This application is based upon and claims the benefit of priority from the prior Japanese Patent Application No. 2002-209652, filed Jul. 18, 2002, the entire contents of which are incorporated herein by reference.

BACKGROUND OF THE INVENTION

1. Field of the Invention

The present invention relates to an information recording and reproduction apparatus and an information recording and reproduction method, for selective recording/reproduction into/from a large-capacity stationary recording medium and a detachable/portable recording medium. Further, the invention relates to a broadcast-receiving apparatus, which selectively records and reproduces received information onto/from the above recording media.

2. Description of the Related Art

In recent years, television receivers with high-capacity hard disks, as well as portable recording media have been developed. For example, HDDs (Hard Disk Drives) of 80 GB are now not uncommon, and these are of the stationary type. As a portable type, DVD-RAM (Digital Versatile Disk-Random Access Memory) of 4.7 GB is commonly used, and they can be attached to the TV receiver.

In these types of TV receivers, programs or other input information can be recorded/reproduced to/from either/both an HDD and DVD-RAM. Further, information in the HDD can also be transferred to DVD-RAM, and vice-versa. However, due to the difference in disk capacity, various problems arise, particularly when information is transferred from HDD to DVD-RAM. For example, the user might not know whether programs stored on the HDD have been copied onto DVD-RAM or not, or how many DVD-RAM disks are required for copying a certain program. When copying information to DVD-RAM, the user may have to use several disks, thus involving mounting them separately, which is troublesome.

If a DVD-RAM disk for recording onto recording is not mounted, a so-called "just recording" function, in which the recording rate is automatically adjusted to completely fill the disk, cannot be used.

Jpn. Pat. Appln. KOKAI Publication Nos. 11-7705, 2000-175139, and 5-282793, and the like disclose examples of the known art regarding a technique which performs recording and reproduction between the two kinds of recording media.

However, Jpn. Pat. Appln. KOKAI Publication No. 11-7705 relates to a technique in which data recorded in a video CD (Compact Disk) is copied to DVD-RAM having a different sector size from that of the video CD.

Jpn. Pat. Appln. KOKAI Publication No. 2000-175139 relates to the technique in which part of a video data file recorded in the detachable optical disk is copied as the file to on HDD.

Further, Jpn. Pat. Appln. KOKAI Publication No. 5-282793 relates to the technique in which track and sector numbers of the large-capacity optical disk are transformed corresponding to the track and sector numbers of the small-capacity optical disk.

However, in these publications of unexamined applications, no solutions are offered to the above-described various problems which occur in recording the information recorded in HDD in DVD-RAM.

BRIEF SUMMARY OF THE INVENTION

According to one aspect of the present invention, there is provided an information recording and reproduction apparatus comprising:

a recording and reproduction section configured to record and reproduce information in and from one recording medium of a first group and one recording medium of a second group, which has a smaller recording capacity than the one recording medium of the first group; and a registering section configured to reserve, in the one recording medium of the first group, a recording region which corresponds to the recording capacity of the one recording medium of the second group.

According to one aspect of the present invention, there is provided a method of recording and reproduction information in and from one recording medium of a first group and one recording medium of a second group, which has a smaller recording capacity than the one recording medium of the first group, the method comprising:

selecting the type of one recording medium of the second group; and inputting the number of recording regions to be reserved in one recording medium of the first group, each corresponding to the recording capacity of one recording medium of the second group; and preserving, in the recording region of the one recording medium of the first group, a number of recording regions, each corresponding to the recording capacity of the one recording medium of the second group and the type selected, the number having been input.

According to one aspect of the present invention, there is provided an apparatus for receiving broadcast information, comprising:

a recording and reproduction section configured to record and reproduce broadcast information in and from one recording medium of a first group and one recording medium of a second group, which has a smaller recording capacity than the one recording medium of the first group; and a registering section configured to reserve, in the one recording medium of the first group, a recording region which corresponds to the recording capacity of the one recording medium of the second group.

DETAILED DESCRIPTION OF THE INVENTION

Figure 1:
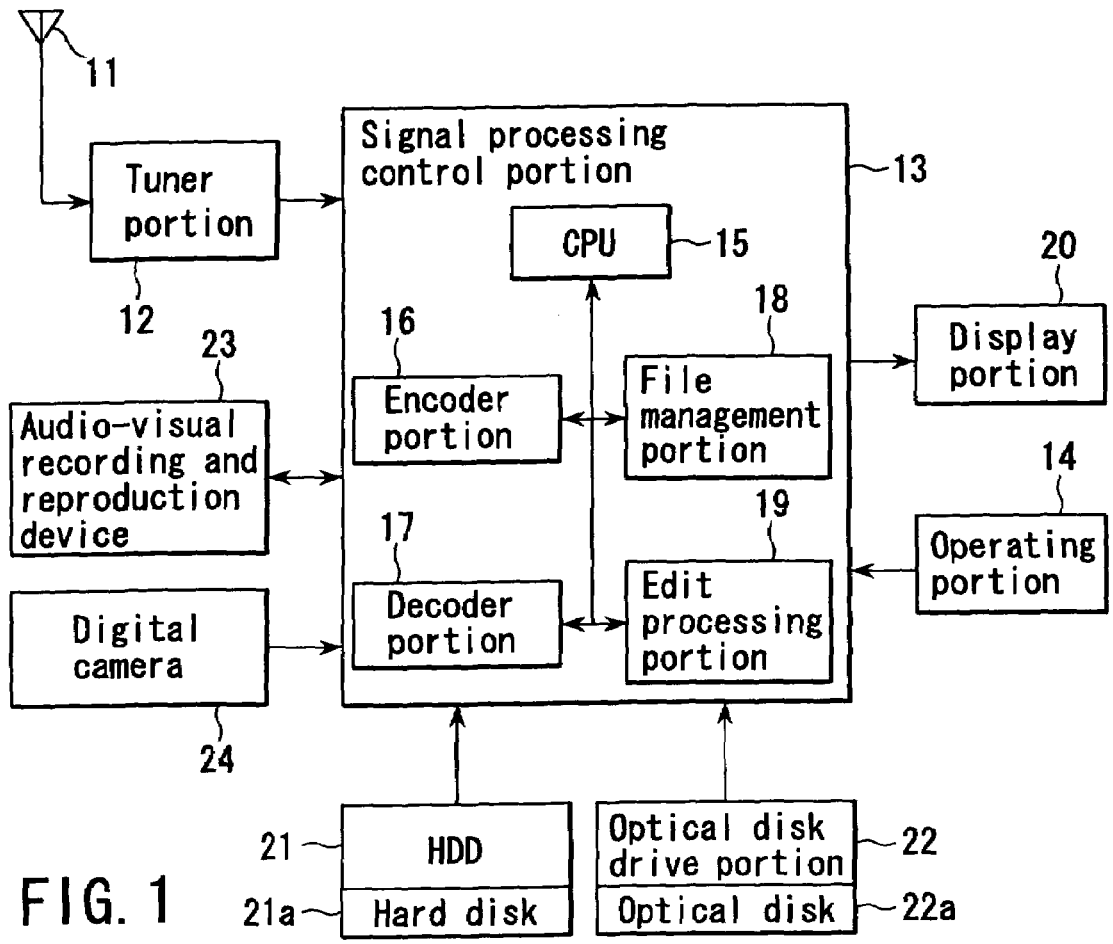
FIG. 1 shows a first embodiment of the invention, and is a block diagram illustrating a television receiver.

Referring to the accompanying drawings, embodiments of the invention will be described in detail below. FIG. 1 shows a first embodiment of the invention, and schematically shows a television receiver.

In FIG. 1, a reference numeral 11 is an antenna. A television broadcast signal received by the antenna 11 is supplied to a tuner portion 12, a video signal of a given channel is selected, and then the signal is supplied to a signal processing control portion 13.

The signal processing control portion 13 includes a CPU 15 (Central Processing Unit) which receives operating information from an operating portion 14 to control the operation of the television receiver, an encoder portion 16 which performs encoding processing to the video signal, a decoder portion 17 which performs decoding processing of the video signal, a file management portion 18, and an edit processing portion 19.

The video signal outputted from the tuner portion 12 is decoded with the decoder portion 17, converted into a format corresponding to an image display, and then supplied to a display portion 20 to be used for the image display.

The signal processing control portion 13 is connected to an HDD 21 which records and reproduces information to a hard disk 21a and an optical disk drive portion 22 which records and reproduces information to an optical disk 22a such as DVD-RAM. Further, external devices such as an audio-visual recording and reproduction device 23 and a digital camera 24 may be connected to the signal processing control portion 13.

The signal processing control portion 13 performs a predetermined encode processing to the video signal outputted from the tuner portion 12 by the encoder portion 16, and the video signal can be selectively recorded into the HDD 21, the optical disk drive portion 22, and the audio-visual recording and reproduction device 23.

The signal processing control portion 13 can also cause the video signals outputted from the HDD 21, the optical disk drive portion 22, the audio-visual recording and reproduction device 23, and the digital camera 24 to be selectively displayed on the display portion 20.

Further, the signal processing control portion 13 can cause the video signal selectively outputted from the HDD 21, the optical disk drive portion 22, the audio-visual recording and reproduction device 23, and the digital camera 24 to be selectively recorded in the HDD 21, the optical disk drive portion 22, and the audio-visual recording and reproduction device 23.

Figure 2:
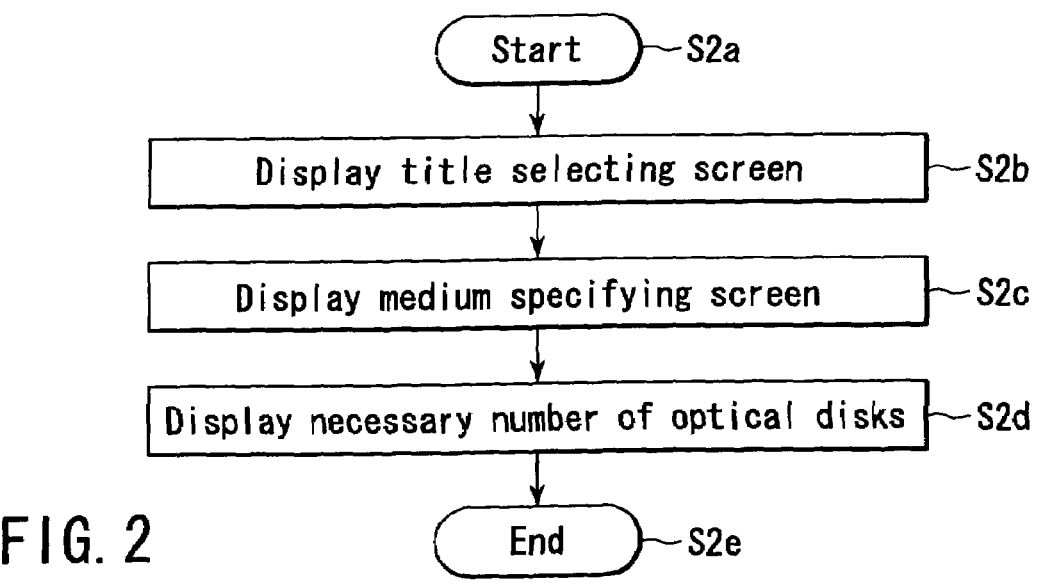
FIG. 2 is a flow chart illustrating characteristic operation in the first embodiment.

In the television receiver having the above-described configuration, the characteristic operation will be described below. A flow chart shown in FIG. 2 illustrates the operation informing a user how many optical disks 22a are required when the information recorded in the hard disk 21a is recorded into the optical disk 22a.

When the processing is started (S2a), the signal processing control portion 13 displays a title selecting screen, in which the user selects a title of information to be recorded in the optical disk 22a among the information recorded in the hard disk 21a, on the display portion 20 in step S2b.

Figure 3A:
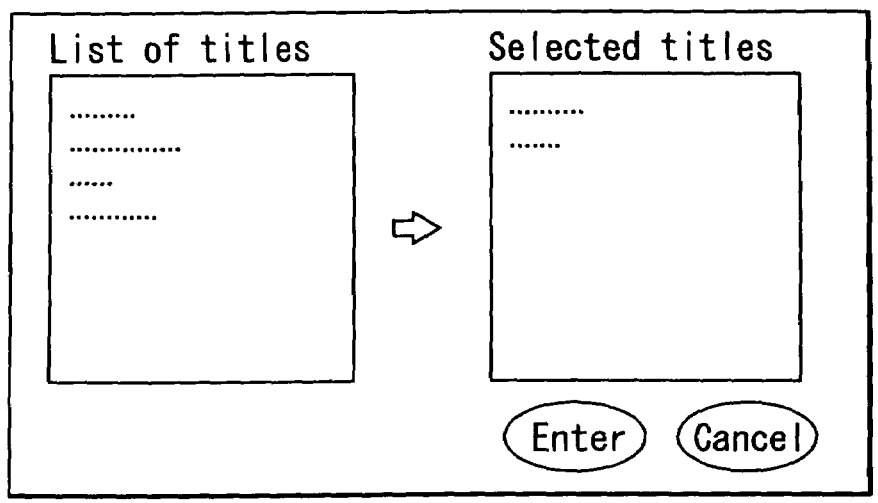
FIGS. 3A to 3C illustrate an example of a display screen in the first embodiment, respectively.

As shown in FIG. 3A, the titles of the information recorded in the hard disk 21a are listed in the title selecting screen. When the user selects a desired title among the listed titles on the screen, the selected title is separately displayed.

Then, in step S2c, the signal processing control portion 13 displays a medium specifying screen, in which the user selects the kind of optical disk 22a performing the recording, on the display portion 20.

Figure 3B:
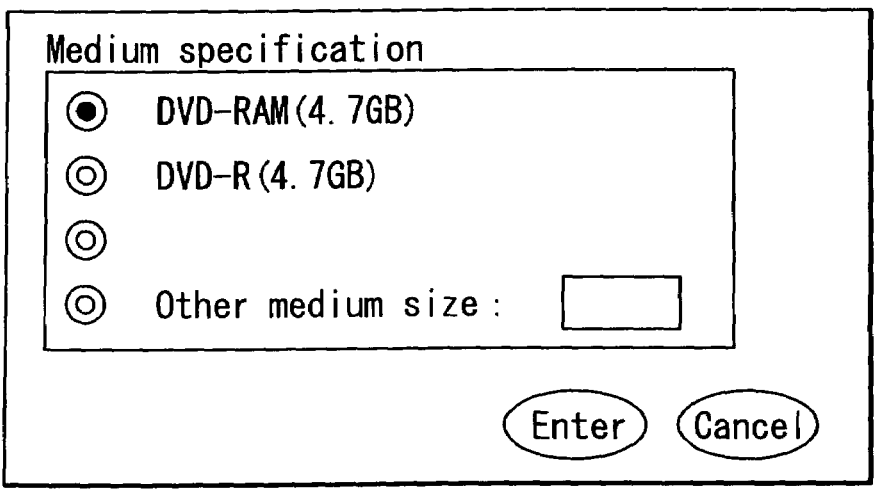

As shown in FIG. 3B, the medium specifying screen lists the kinds of optical disk 22a, such as DVD-RAM or DVD-R (Recordable). The user selects a desired kind among the listed kinds on the screen. FIG. 3B shows a state in which DVD-RAM is selected.

As described above, when the title of the information to be recorded in the optical disk 22a among the information recorded in the hard disk 21a and the kind of the optical disk 22a in which the information is recorded are set, the signal processing control portion 13 calculates the necessary number of optical disks 22a to display it on the display portion 20 (step S2d), and ends the processing (step S2e).

Figure 3C:
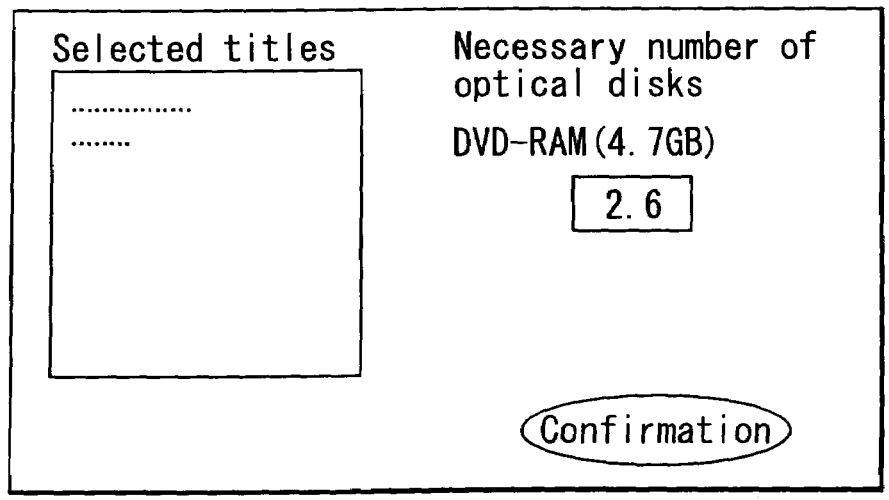

As shown in FIG. 3C, the display screen of the necessary number of optical disks 22a displays the title selected in step S2b, the kind of optical disk 22a selected in step S2c, and the necessary number of optical disks 22a.

According to the first embodiment, the function informing the user of the necessary number of optical disks 22a is provided when the information recorded in the hard disk 21a is recorded in the optical disk 22a, so that handing can be convenient for the user.

A second embodiment of the invention will be described below. A flow chart shown in FIG. 4 illustrates the registering operation for reserving a recording region (virtual medium) corresponding to a recording capacity of the optical disk 22a (or the plurality of optical disks), in which the user specifies the kind, on the recording region of the hard disk 21a.

When the processing is started (S4a), the signal processing control portion 13 displays a medium specifying screen, in which the user selects the kind of optical disk 22a for which the recording region is reserved on the hard disk 21a, on the display portion 20 in step S4b.

Figures 4, 5A, 5B:
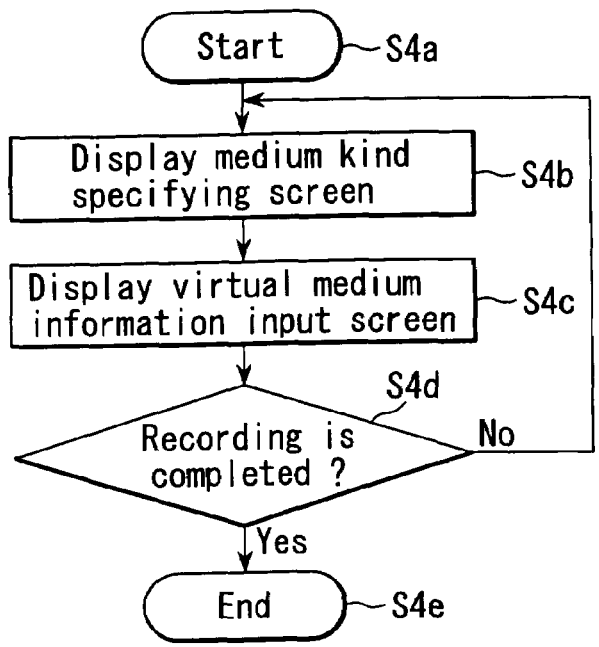
FIG. 4 shows a second embodiment of the invention, and is a flow chart illustrating characteristic operation.
FIGS. 5A and 5B illustrate an example of the display screen in the second embodiment, respectively.

As shown in FIG. 5A, the type of optical disk 22a, such as DVD-RAM or DVD-R, are listed in the medium specifying screen. The user selects the desired type from the list on the screen. FIG. 5A shows a state in which DVD-RAM is selected.

As shown in FIG. 5B, in step S4c, the signal processing control portion 13 displays a screen, in which the user inputs virtual medium information indicating a name (virtual medium name) of the recording region reserved on the hard disk 21a, the number (creation number) of optical disks 22a, or the like, on the display portion 20. FIG. 5B shows an inputted state in which the virtual medium name is A and the number (creation number) of optical disks 22a constituting the virtual medium is two.

The signal processing control portion 13 decides whether or not the registering operation is completed in step S4d. When it is decided that the registering operation is not completed (NO), the processing is returned to the step S4b. When it is decided that the registering operation is completed (YES), the signal processing control portion 13 ends the processing (step S4e).

Figure 6:
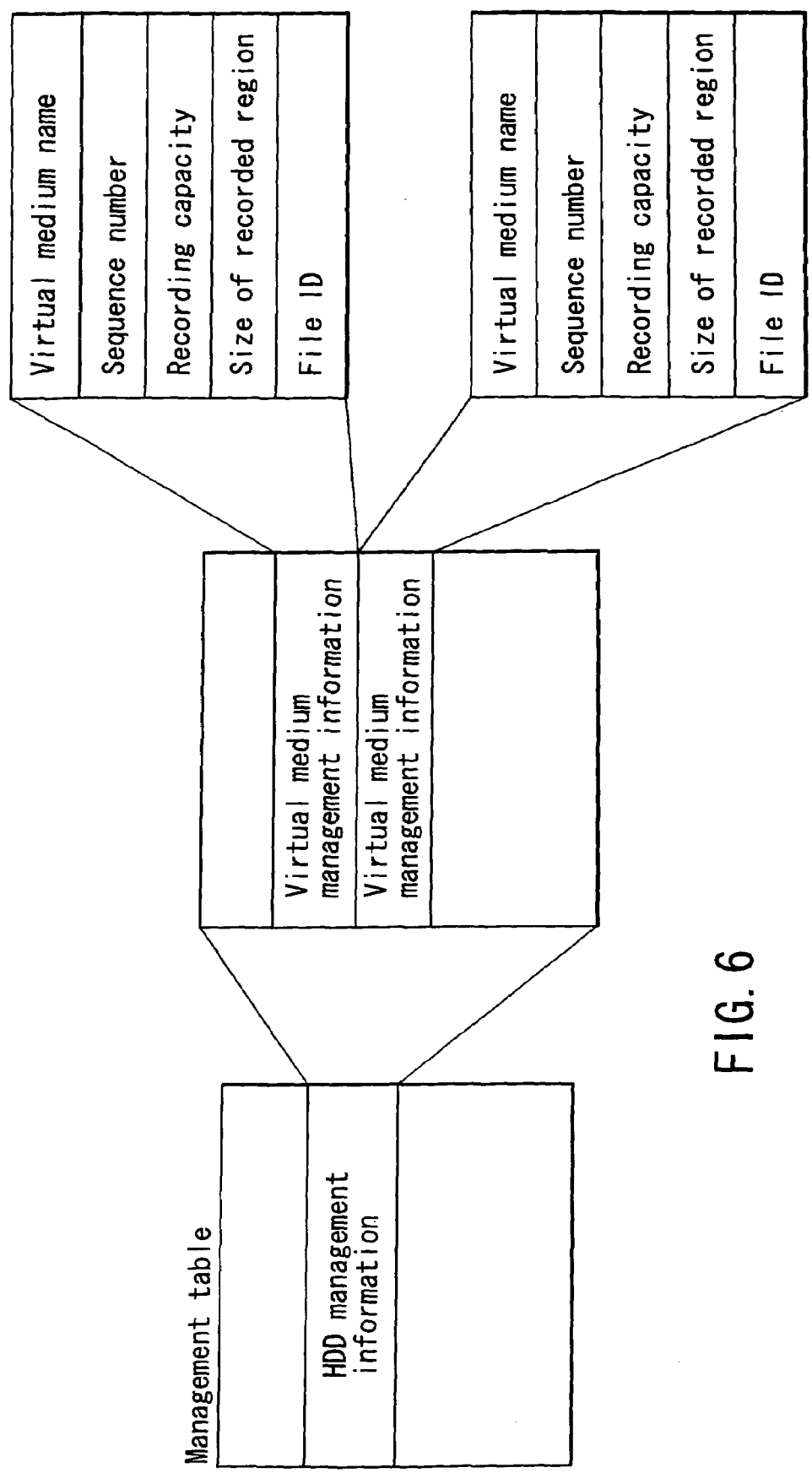
FIG. 6 illustrates a detail of a management table in the second embodiment.

The contents of the registration are stored in the file management portion 18. As shown in FIG. 6, the file management portion 18 includes a management table. The management table stores various kinds of management information for managing the HDD 21, the optical disk drive portion 22, the audio-visual recording and reproduction device 23, the digital camera 24, and the like.

The contents of the registration are stored as virtual medium management information in HDD management information of the management table. Each piece of virtual medium management information relates to one optical disk 22a, and is information such as a virtual medium name, a sequence number, the recording capacity, a size of the recorded region, and a file ID of the region which is allocated to the hard disk 21a.

Figure 7:
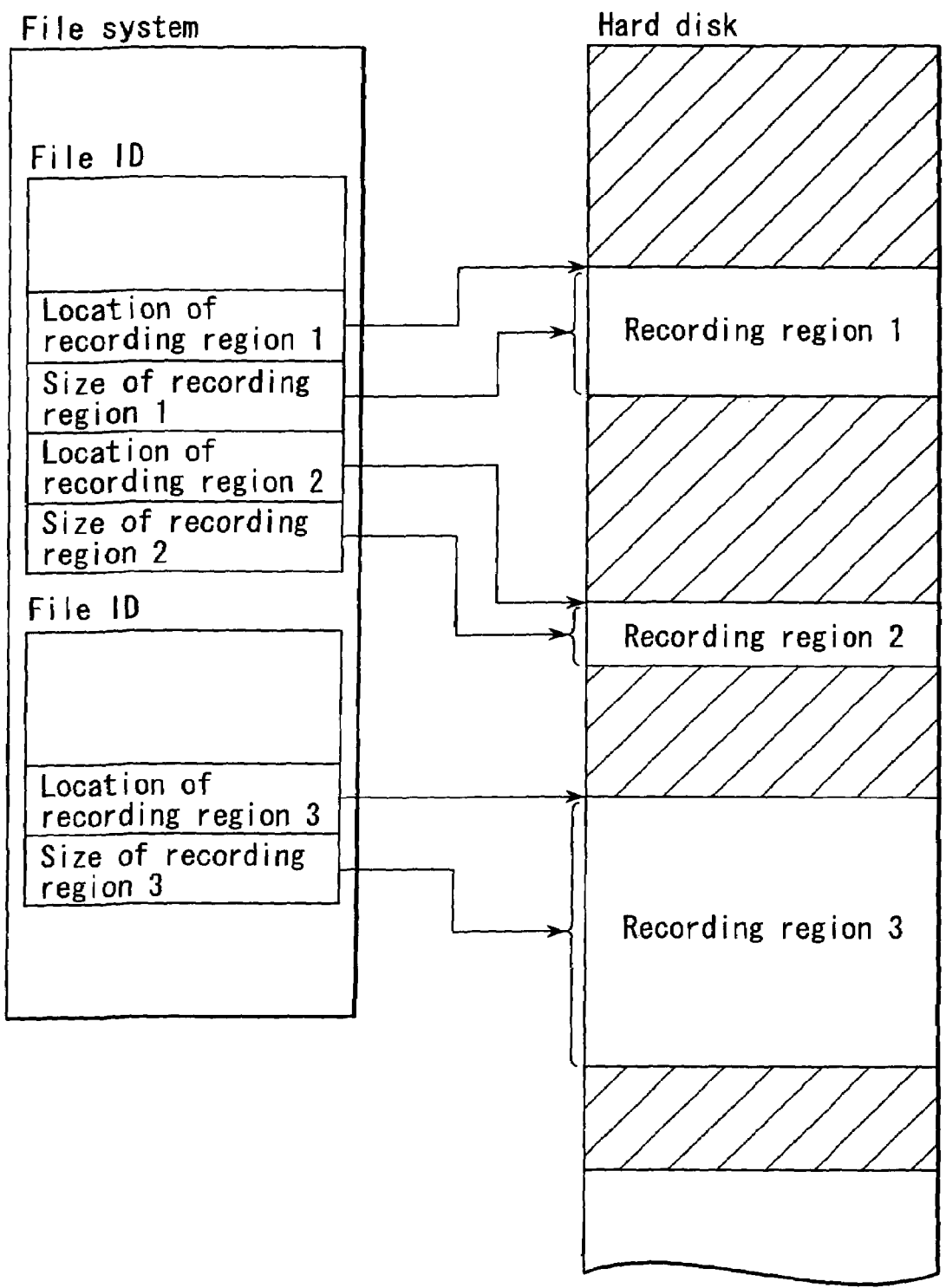
FIG. 7 illustrates a relationship between a file system and a hard disk in the second embodiments.

In this case, the file ID constitutes a file system indicating a location (leading address) and the size of the recording regions 1, 2, 3, . . . , which are reserved on the hard disk 21a as shown in FIG. 7. Consequently, the recording region corresponding to one disk of the optical disk 22a can be reserved by combining plural empty regions on the hard disk 21a.

Figure 8:
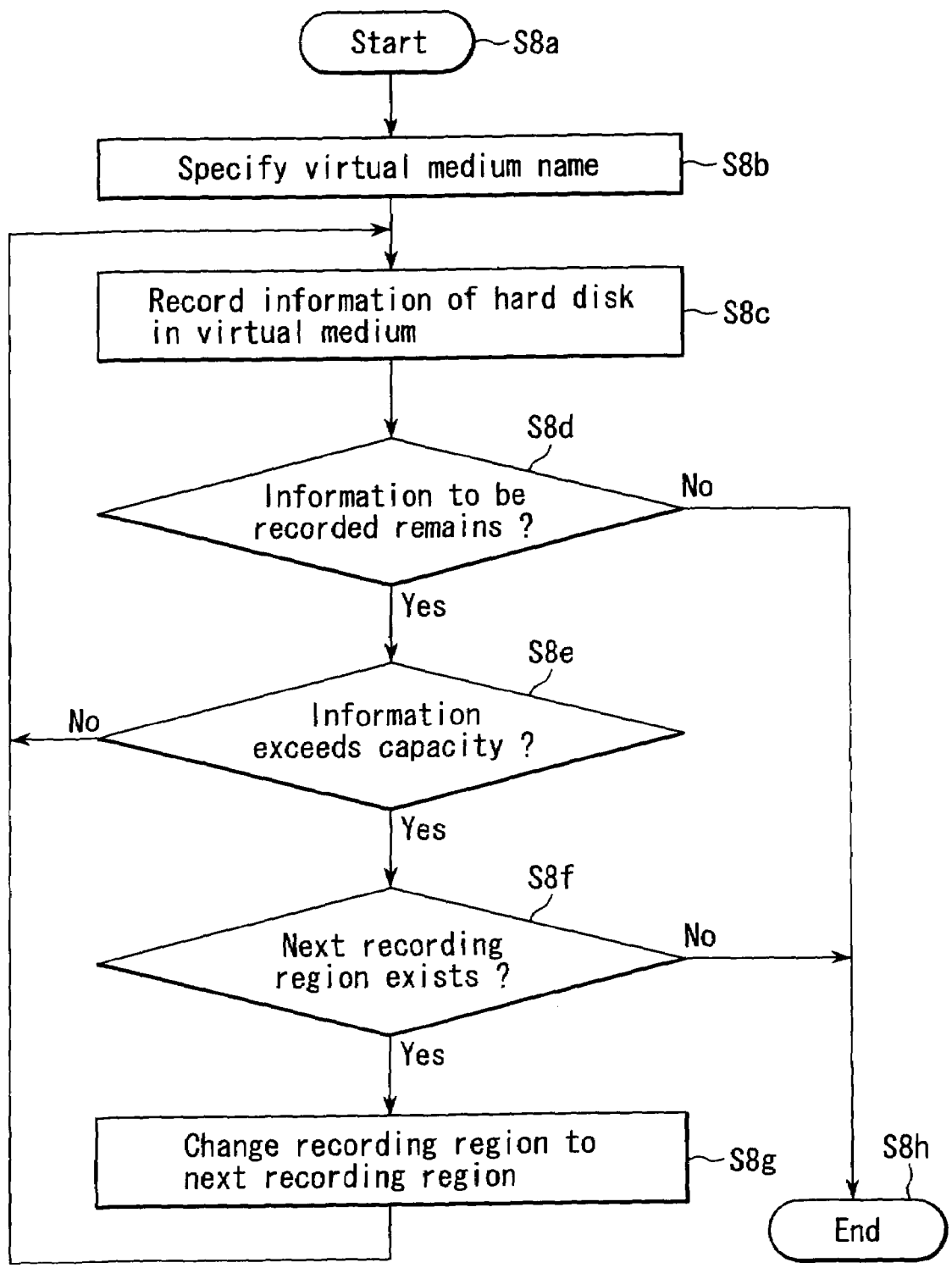
FIG. 8 is a flow chart illustrating information recording operation to a virtual medium in the second embodiment.

A flow chart shown in FIG. 8 illustrates the operation of recording the information recorded in the hard disk 21a in the recording region reserved on the hard disk 21a, i.e., copying the information within the hard disk 21a.

When the processing is started (step S8a) and the user specifies the virtual medium name in step S8b, the signal processing control portion 13 reproduces the information recorded in the hard disk 21a and records it in the recording region having the smallest sequence number among the recording regions on the hard disk 21a, for constituting the specified virtual medium, in step S8c.

In step S8d, the signal processing control portion 13 decides whether or not the information to be recorded in the specified virtual medium still remains. When it is decided that the information does not remain (NO), the processing is ended (step S8h).

When it is decided that the information remains in step S8d (YES), the signal processing control portion 13 decides whether or not the amount of information has exceeded the capacity of the recording region having the smallest sequence number in step S8e, and the processing is returned to the step S8c when the amount of information has not exceeded the capacity of the recording region (NO).

When it is decided that the amount of information has exceeded the capacity of the recording region having the smallest sequence number (YES), the signal processing control portion 13 decides whether or not the recording region of the next sequence number exists on the hard disk 21a in step S8f, and the processing is ended (step S8h) when it is decided that the recording region of the next sequence number does not exist on the hard disk 21a (NO).

When it is decided that the recording region of the next sequence number exists on the hard disk 21a (YES), the signal processing control portion 13 changes the recording region to the recording region of the next sequence number in step S8g, and the processing is returned to the step S8c.

Figure 9:
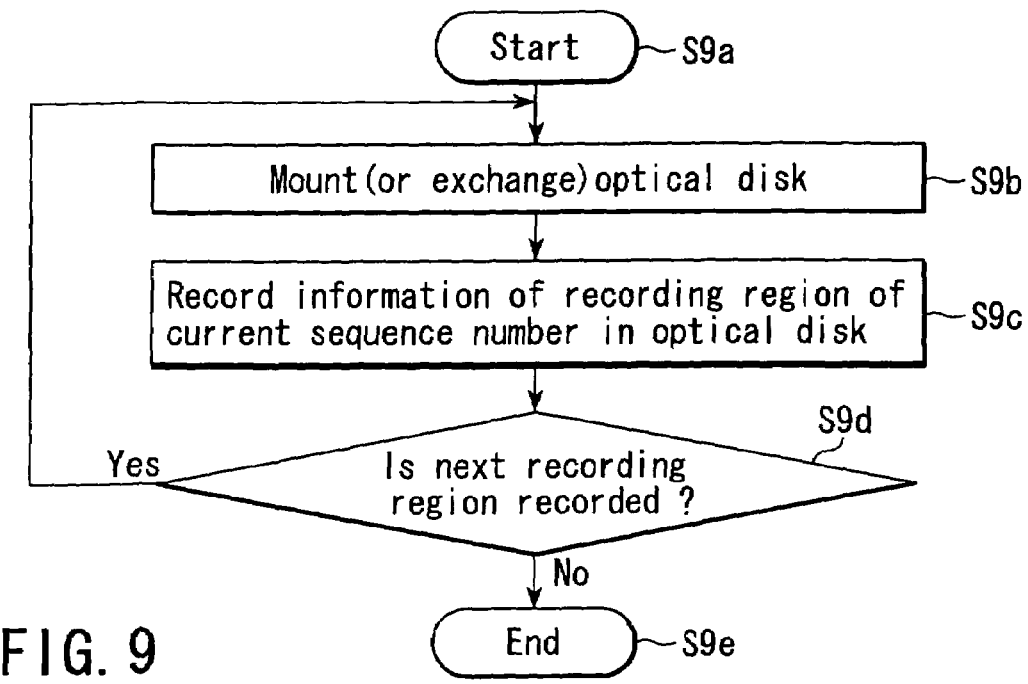
FIG. 9 is a flow chart illustrating the information recording operation from the virtual medium to an optical disk in the second embodiment.

A flow chart shown in FIG. 9 illustrates the operation actually recording the information recorded in the virtual medium on the hard disk 21a in the optical disk 22a in the above-described way.

When the processing is started (step S9a) and the optical disk 22a is mounted on the optical disk drive portion 22 in step S9b, the signal processing control portion 13 reproduces the information from the recording region having the initial sequence number on the hard disk 21a and records it in the optical disk 22a mounted on the optical disk drive portion 22 in step S9c.

The signal processing control portion 13 decides whether or not the information is recorded in the recording region of the next sequence number in step S9d. When it is decided that the information is not recorded in the recording region of the next sequence number (NO), the processing is ended (S9e). When it is decided that the information is recorded in the recording region of the next sequence number (YES), the sequence number is changed to the next number to transfer the processing to the step S9b.

According to the second embodiment, the user reserves the recording region corresponding to the kind and the number of disks of the optical disk 22a as the virtual medium on the hard disk 21a, so that the processing, in which the information corresponds to the plural optical disks 22a and is divided on the hard disk 21a, can be performed without mounting the optical disk 22a on the optical disk drive portion 22.

Since the information is recorded while the information is divided in every optical disk 22a on the hard disk 21a, when the information is actually recorded from the hard disk 21a to the optical disk 22a, the information of the recording region indicated by one sequence number of the hard disk 21a is only directly transferred to the optical disk 22a, and the task of recording the information by dividing it into the plural optical disks 22a can be largely simplified.

A third embodiment of the invention will be described below. A flow chart shown in FIG. 10 illustrates another example in which the information recorded in the hard disk 21a is copied in the recording region reserved on the hard disk 21a.

Figure 10:
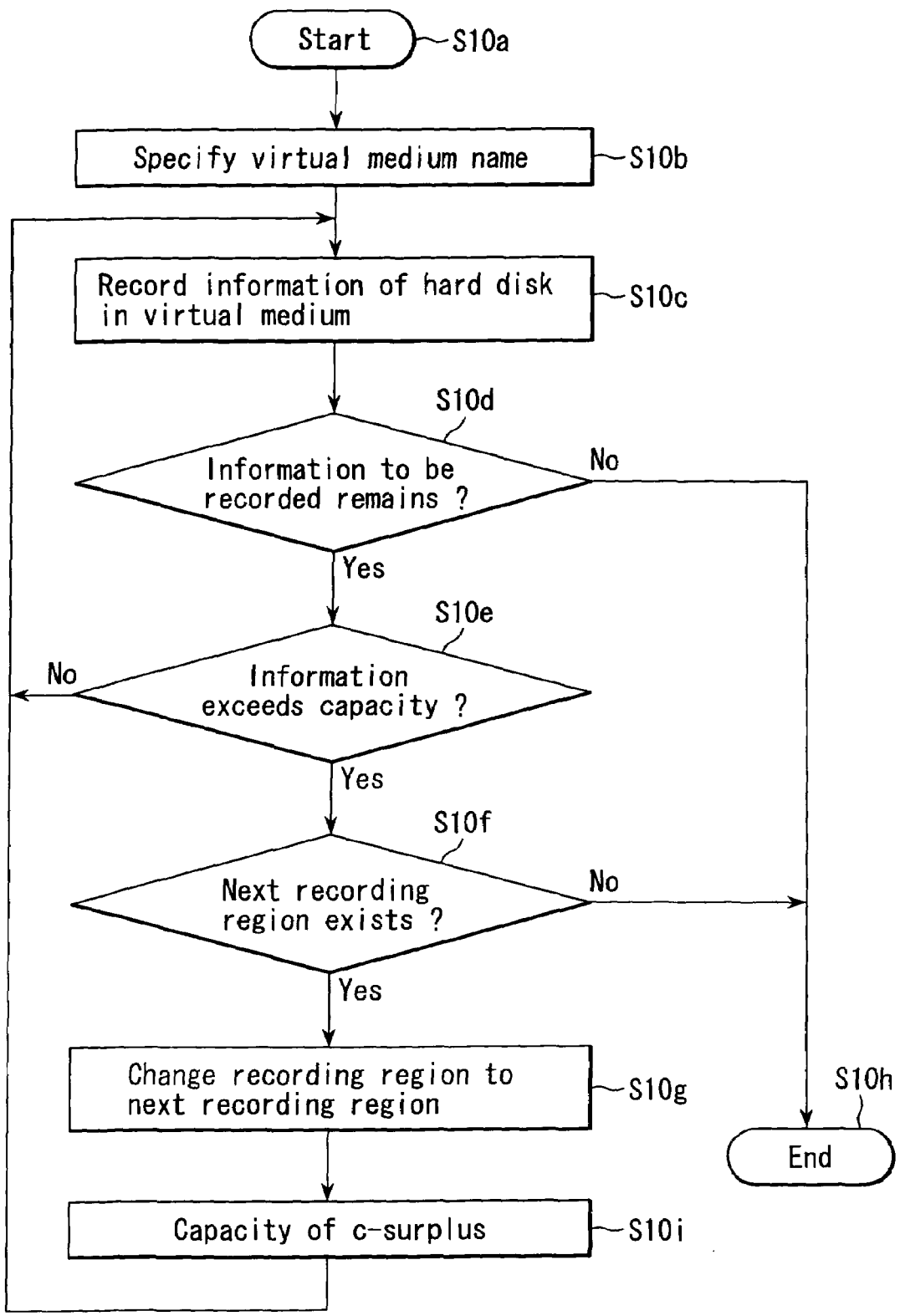
FIG. 10 shows a third embodiment of the invention, and is a flow chart illustrating information recording operation to a virtual medium.

In FIG. 10, steps S10a to S10h are the same as steps S8a to S8h shown in FIG. 8. That is, in the specified virtual media, the recording region having the smallest sequence number is filled on the hard disk 21a, the recording region is changed to the recording region having the next sequence number in step S10g. Thereafter, the signal processing control portion 13 subtracts the capacity c of a predetermined surplus from the capacity C of the recording region having the next sequence number in step S10i.

Consequently, with reference to all the recording regions other than the recording region having the smallest sequence number on the hard disk 21a, the recording of the information is performed for the capacity obtained by subtracting the capacity c of the surplus from the capacity C of the recording region. In other words, with respect to all the recording regions other than the recording region having the smallest sequence number, information is recorded while the capacity c of the surplus remains.

Figure 11:
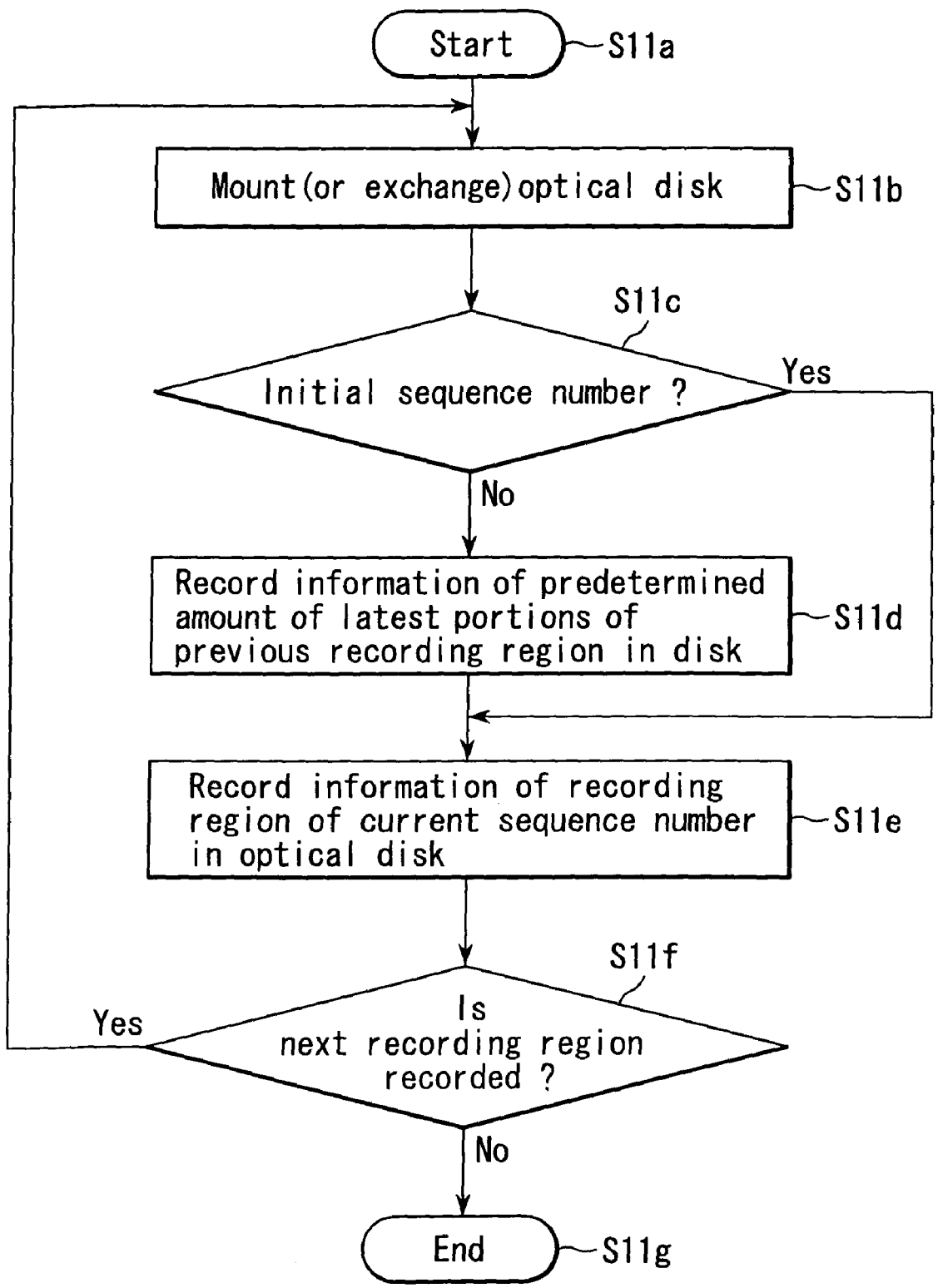
FIG. 11 is a flow chart illustrating the information recording operation from the virtual medium to an optical disk in the third embodiment.

A flow chart shown in FIG. 11 illustrates the operation of actually recording the information recorded in the virtual medium on the hard disk 21a in the optical disk 22a in the above-described way.

When the processing is started (step S11a) and the optical disk 22a is mounted on the optical disk drive portion 22 in step S11*b*, the signal processing control portion 13 decides whether or not the recording region reading the information from the hard disk 21*a* is the recording region of the initial sequence number in step S11*c*.

When the signal processing control portion 13 decides that it is not the recording region of the initial sequence number (NO), the signal processing control portion 13 records the predetermined amount of latest portions (corresponding to the capacity c of the surplus) of the information, which is recorded in the recording region of the previous sequence number, in the optical disk 22*a* in step S11*d*.

After this step S11*d*, or when it is decided that it is the recording region of the initial sequence number (YES) in the above-described step S11*c*, the signal processing control portion 13 reproduces the information from the recording region having the current sequence number and records it in the optical disk 22*a* mounted on the optical disk drive portion 22 in step S11*e*.

Then, the signal processing control portion 13 decides whether or not the information is recorded in the recording region of the next sequence number in step S11*f*. When it is decided that the information is not recorded (NO), the processing is ended (step S11*g*). When it is decided that the information is recorded (YES), the sequence number is changed to the next value and the processing is returned to the step S11*b*.

Figure 12:
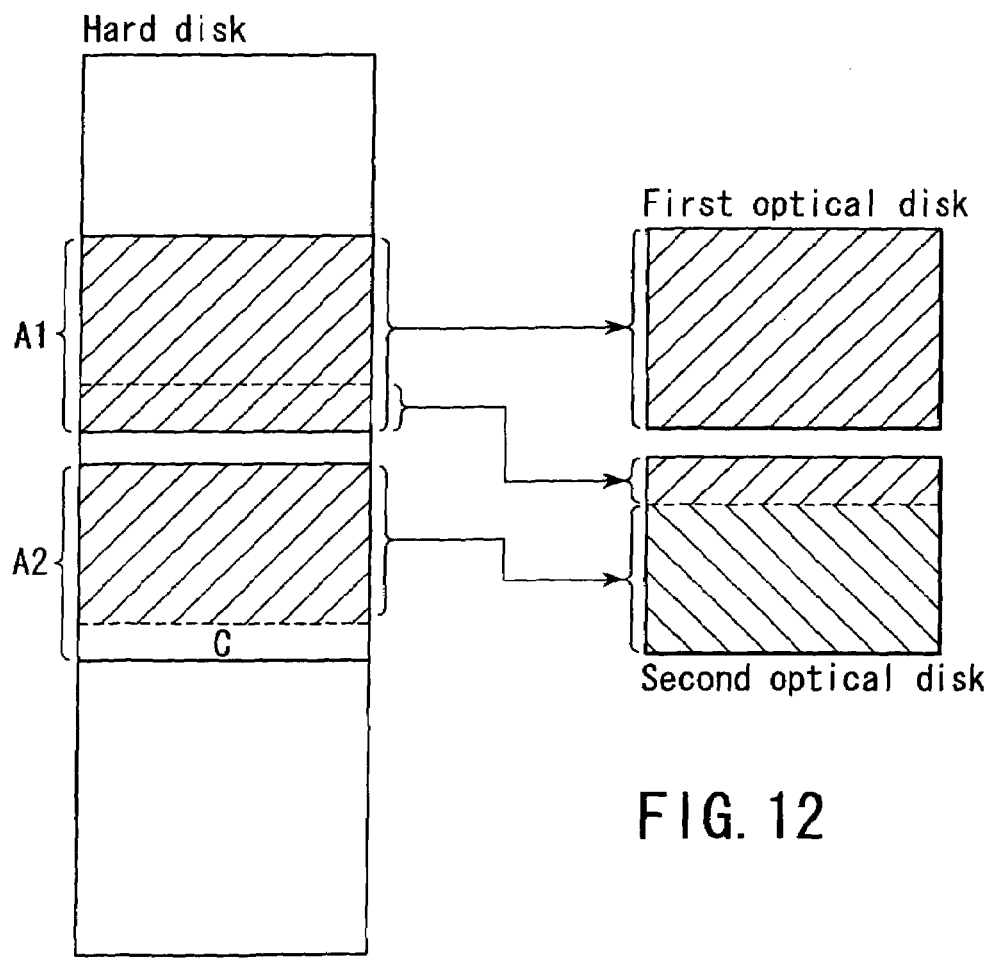
FIG. 12 illustrates an information recording state to the hard disk and an information recording state to the optical disk in the third embodiment.

FIG. 12 shows a sate in which the information including the above-described surplus is recorded in the hard disk 21*a* and a state in which the information is recorded from the hard disk 21*a* to the optical disk 22*a*.

On the hard disk 21*a*, the information is recorded in the whole recording region A1 having the smallest sequence number, as shown by oblique lines. Further, the information is recorded in a recording region A2 having the sequence number larger than that of the recording region A1 so that the capacity c of the surplus portion is zero.

The information of the recording region A1 is directly recorded in the first optical disk 22*a*. In the second optical disk 22*a*, the information of the latest portion of the recording region A1 is recorded in an amount corresponding to only the capacity c of the surplus. Then, the information of the recording region A2 is directly recorded in the second optical disk 22*a*.

According to the third embodiment, when the information is divisionally recorded in the plural optical disks 22*a*, the latest portion of the information recorded in the previous optical disk 22*a* is recorded in the second or later optical disks 22*a*. Therefore, when the optical disk 22*a* is changed in reproducing the optical disk 22*a*, the image of the latest portion of the previous optical disk 22*a* is reproduced, and then a new video image is displayed, so that it is convenient for the user.

Figure 13:
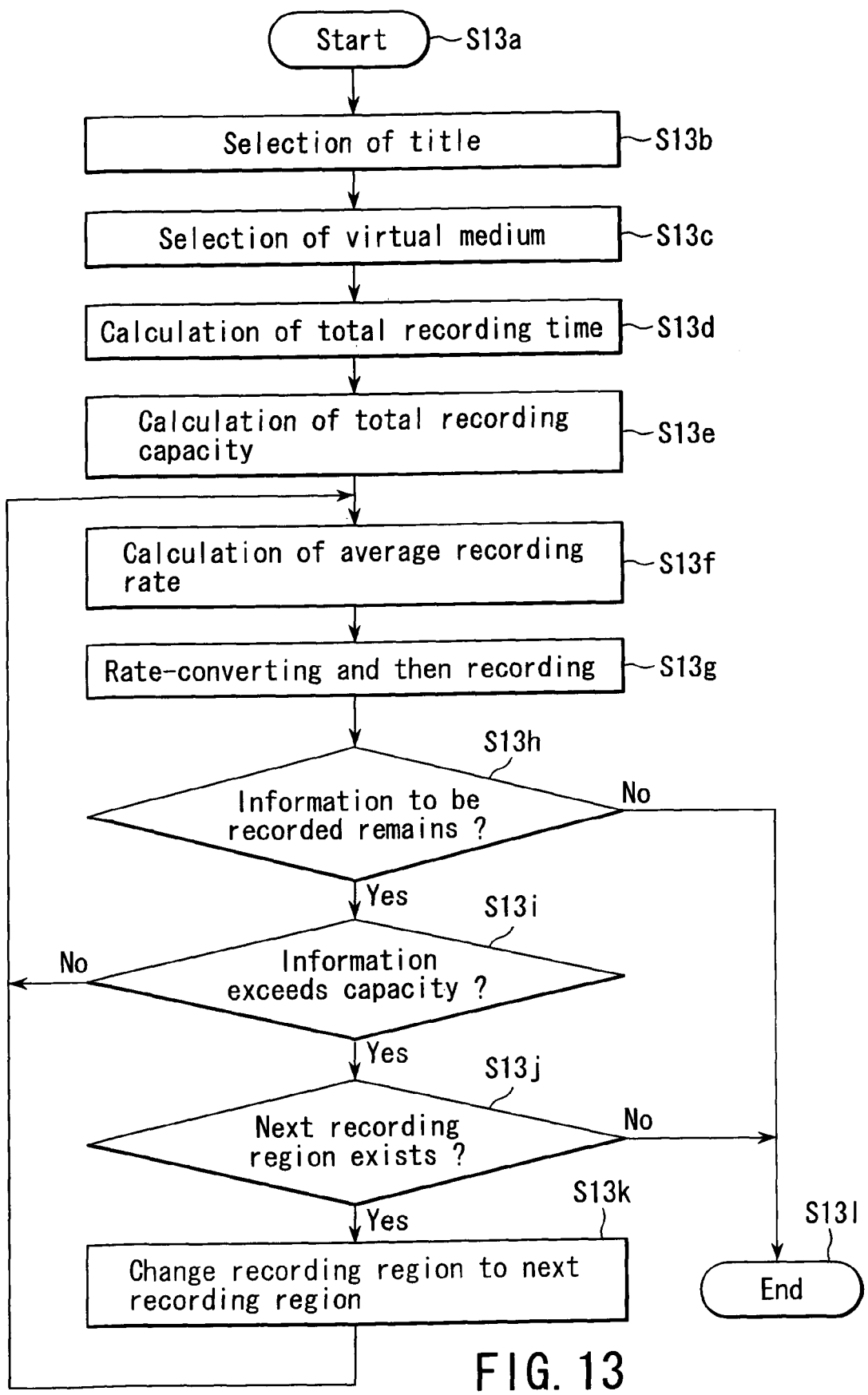
FIG. 13 shows a fourth embodiment of the invention, and is a flow chart illustrating information recording operation to a virtual medium.

A fourth embodiment of the invention will be described below. A flow chart shown in FIG. 13 illustrates the operation of rate-converting the information recorded in the hard disk 21*a* and recording it in the recording region reserved on the hard disk 21*a*.

When the processing is started (step S13*a*), the selection of the title is performed in step S13*b*, and the selection of the virtual medium is performed in step S13*c*, the signal processing control portion 13 determines total recording time of the information corresponding to the title in step S13*d* and determines total recording capacity of the virtual medium in step S13*e*.

Then, the signal processing control portion 13 calculates an average recording rate during the encoding from the previously determined total recording time and total recording capacity in step S13*f*. In step S13*g*, the signal processing control portion 13 reproduces the information recorded in the hard disk 21*a*, re-encodes the information so as to perform the rate-conversion, and records the information in the recording region having the smallest sequence number among the recording regions constituting the specified virtual medium on the hard disk 21*a*.

The signal processing control portion 13 decides whether or not the information to be recorded in the specified virtual medium sill remains in step S13*h*. When it is decided that the information does not remain (NO), the processing is ended (step S13*l*).

When it is decided that the information to be recorded remains in step S13*h* (YES), the signal processing control portion 13 decides whether or not the amount of information exceeds the capacity of the recording region having the smallest sequence number in step S13*i*. When it is decided that the amount of information does not exceed the capacity of the recording region having the smallest sequence number (NO), the processing is returned to the step S13*f*.

When it is decided that the amount of information exceeds the capacity of the recording region having the smallest sequence number (YES), the signal processing control portion 13 decides whether or not the recording region of the next sequence number exists on the hard disk 21*a* in step S13*j*. When it is decided that the is recording region of the next sequence number does not exist on the hard disk 21*a* (NO), the processing is ended (step S13*l*).

When it is decided that the recording region of the next sequence number exists on the hard disk 21*a* (YES), the signal processing control portion 13 changes the recording region of the information to the recording region of the next sequence number in step S13*k*, and the processing is returned to the step S13*f*.

In steps S13*f* and S13*g*, considering how the rate changes during the encoding process by the video image, it is necessary to perform the control by periodically performing feedback to the encoding rate such that the information does not exceed the recording capacity of the virtual medium.

According to the fourth embodiment, since the recording rate is automatically set on the basis on the total recording time of the information and the total recording capacity of the virtual medium, the handling is convenient for the user. Further by providing this function, the recording rate of the just recording can be calculated without actually mounting the optical disk 22*a* on the optical disk drive portion 22. The just recording can be performed on the virtual medium.

What is claimed is:

1. An information recording and reproduction apparatus comprising:

a recording and reproduction section configured to record and reproduce information in and from one recording medium of a first group and one recording medium of a second group that has a smaller recording capacity than said one recording medium of the first group; and a registering section configured to reserve, in said one recording medium of the first group, a recording region which corresponds to the recording capacity of said one recording medium of the second group, the registering section comprising:

a selecting unit configured to select the type of one recording medium of the second group;

an input unit configured to input the number of recording regions to be reserved in one recording medium of the first group, each corresponding to the recording capacity of one recording medium of the second group; and a setting unit configured to reserve, in the recording region of said one recording medium of the first group, a number of recording regions, each corresponding to the recording capacity of said one recording medium of the second group and the type selected by the selecting unit, said number having been input by the input unit.

2. The apparatus according to claim 1, wherein the recording and reproduction section records the information recorded in said one recording medium of the first group, in the recording region which the registering section has reserved in one recording medium of the first group.

3. The apparatus according to claim 2, wherein the recording and reproduction section records, in one recording medium of the second group, the information recorded in the recording region reserved in the one recording medium of the first group.

4. The apparatus according to claim 1, wherein the recording and reproduction section changes a rate of the information recorded in one recording medium of the first group and records the information in the recording region which the registering section has reserved in said one recording medium of the first group.

5. The apparatus according to claim 1, wherein the recording and reproduction section records the information in the recording regions which the registering section has reserved in one recording medium of the first group, leaving a vacant area of a predetermined size in all recording regions except the recording region at which the recording of information starts.

6. A method of recording and reproduction information in and from one recording medium of a first group and one recording medium of a second group that has a smaller recording capacity than said one recording medium of the first group, said method comprising:

selecting the type of one recording medium of the second group;

inputting the number of recording regions to be reserved in one recording medium of the first group, each corresponding to the recording capacity of one recording medium of the second group; and preserving, in the recording region of said one recording medium of the first group, a number of recording regions, each corresponding to the recording capacity of said one recording medium of the second group and the type selected, said number having been input.

7. The method according to claim 6, further comprising recording the information recorded in one recording medium of the first group, in the recording region reserved in the one recording medium of the first group.

8. The method according to claim 7, further comprising recording the information recorded in the recording region reserved in said one recording medium of the first group, in said one recording medium of the second group.

9. The method according to claim 6, further comprising changing a rate of the information recorded in one recording medium of the first group and recording the information in the recording region reserved in said one recording medium of the first group.

10. The method according to claim 6, further comprising recording the information in the recording regions reserved in one recording medium of the first group, leaving a vacant area of a predetermined size in all recording regions except the recording region at which the recording of information starts.

11. An apparatus for receiving broadcast information, comprising:

a recording and reproduction section configured to record and reproduce broadcast information in and from one recording medium of a first group and one recording medium of a second group that has a smaller recording capacity than said one recording medium of the first group; and a registering section configured to reserve, in said one recording medium of the first group, a recording region which corresponds to the recording capacity of said one recording medium of the second group, wherein the recording and reproduction section records the broadcast information recorded in said one recording medium of the first group, in the recording region which the registering section has reserved in one recording medium of the first group, and wherein the recording and reproduction section records, in one recording medium of the second group, the broadcast information recorded in the recording region reserved in the one recording medium of the first group.

12. An apparatus for receiving broadcast information, according to claim 11, wherein the recording and reproduction section changes a rate of the information recorded in one recording medium of the first group and records the information in the recording region which the registering section has reserved in said one recording medium of the first group.

13. An apparatus for receiving broadcast information, according to claim 11, wherein the recording and reproduction section records the information in the recording regions which the registering section has reserved in one recording medium of the first group, leaving a vacant area of a predetermined size in all recording regions except the recording region at which the recording of information starts.

* * * * *